US010028034B2

(12) United States Patent
Kwak et al.

(10) Patent No.: US 10,028,034 B2
(45) Date of Patent: *Jul. 17, 2018

(54) APPARATUS FOR PROVIDING URGENT ALARM SERVICE THROUGH BROADCAST SYSTEM AND METHOD THEREFOR

(71) Applicant: LG ELECTRONICS INC., Seoul (KR)

(72) Inventors: Minsung Kwak, Seoul (KR); Jeongwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,503

(22) Filed: Jun. 15, 2017

(65) Prior Publication Data
US 2017/0311049 A1    Oct. 26, 2017

Related U.S. Application Data

(63) Continuation of application No. 15/259,643, filed on Sep. 8, 2016, now Pat. No. 9,699,623, which is a
(Continued)

(51) Int. Cl.
*H04N 21/81* (2011.01)
*H04H 20/59* (2008.01)
*H04N 21/435* (2011.01)

(52) U.S. Cl.
CPC .......... *H04N 21/814* (2013.01); *H04H 20/59* (2013.01); *H04N 21/435* (2013.01)

(58) Field of Classification Search
CPC ............................... H04H 20/29; H04H 20/71
(Continued)

(56) References Cited

U.S. PATENT DOCUMENTS

2008/0216113 A1* 9/2008 Yun .................. H04H 20/59
725/33
2009/0170467 A1   7/2009 Nowlan et al.
2009/0252253 A1  10/2009 Choi et al.
2010/0186029 A1   7/2010 Kim et al.
(Continued)

FOREIGN PATENT DOCUMENTS

CA         2837053 A1   11/2012
CN         1894949 A     1/2007
(Continued)

OTHER PUBLICATIONS

"ATSC Mobile DTV Standard: A/153 Part 1, ATSC Mobile DTV System (A/153 Part 1:2013)," Mar. 2013, XP055180233, Retrieved from the Internet: URL:http://www.atsc.org/cms/standards/a153/A153-Part-1-2013.pdf, 20 pages.

*Primary Examiner* — John J Lee
(74) *Attorney, Agent, or Firm* — Dentons US LLP

(57) ABSTRACT

The present invention relates to a method for receiving urgent alarm contents through a broadcast system. According to an embodiment of the present invention, a method for receiving urgent alarm contents through a broadcast system includes the steps of: receiving a broadcast signal; parsing an urgent alarm table contained in the broadcast signal, the urgent alarm table containing an urgent alarm message and an urgent alarm contents transmission structure descriptor for signaling the information of the urgent alarm contents concerning the urgent alarm message, and the urgent alarm contents transmission structure descriptor containing the IP address of an IP datagram for transmitting the urgent alarm contents; receiving the IP datagram of the IP address; and decoding the IP datagram so as to reproduce the urgent alarm contents.

8 Claims, 16 Drawing Sheets

Related U.S. Application Data continuation of application No. 14/765,257, filed as application No. PCT/KR2014/000908 on Feb. 3, 2014, now Pat. No. 9,467,240.

(60) Provisional application No. 61/760,158, filed on Feb. 3, 2013.

(58) Field of Classification Search
USPC ..... 455/3.01, 3.03, 404.1, 414.1, 567, 452.1
See application file for complete search history.

(56) References Cited

U.S. PATENT DOCUMENTS

| | | | |
|---|---|---|---|
| 2010/0257570 A1 | 10/2010 | Song et al. | |
| 2012/0084808 A1* | 4/2012 | Howarter | G08B 27/008 725/33 |
| 2013/0242847 A1* | 9/2013 | Oh | H04W 4/22 370/312 |
| 2013/0247094 A1* | 9/2013 | Hardin | H04N 21/2385 725/33 |

FOREIGN PATENT DOCUMENTS

| | | |
|---|---|---|
| CN | 102217334 A | 10/2011 |
| JP | 2007-081516 A | 3/2007 |
| KR | 1020060064623 A | 6/2006 |
| KR | 1020090108434 A | 10/2009 |
| KR | 1020090108445 A | 10/2009 |
| KR | 1020110097862 A | 8/2011 |
| WO | 2009/038405 A2 | 3/2009 |
| WO | 2012161552 A2 | 11/2012 |

\* cited by examiner

FIG. 6

| Syntax | No. Bits | Format |
|---|---|---|
| EAT_MH_section() () { | | |
|     table_id | 8 | 0xEA |
|     section_syntax_indicator | 1 | '0' |
|     private_indicator | 1 | '1' |
|     reserved | 2 | '11' |
|     section_length | 12 | uimsbf |
|     table_id_extension { | | |
|         EAT_MH_protocol_version | 8 | 0X0 |
|         ensemble_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_tuning_info | | |
|     ( | | |
|       automatic_tuning_channel_number | 8 | uimsbf |
|       automatic_tuning_ts_id | 16 | uimsbf |
|       automatic_tuning_ensemble_id | 8 | uimsbf |
|       automatic_tuning_service_id | 16 | uimsbf |
|     ) | | |
|     num_EAS_messages | 8 | uimsbf |
|     for (m=0; m< num_EAS_messages; m++) { | | |
|     EAS_message_id | 32 | uimsbf |
|     reserved | 7 | '1111111' |
|     type_of_responder | 2 | uimsbf |
|     EAS_IP_version_flag | 1 | bslbf |
|     EAS_message_transfer_type | 3 | uimsbf |
|       EAS_message_encoding_type | 3 | uimsbf |
|       if(type_of_responder == 0x01 \| 0x03){ | | |
|         reserved | 10 | |
|         type_of_disciplines | 6 | uimsbf |
|       } | | |
|       if(EAS_message_transfer_type == 0x02) { | | |
|         reserved | 4 | '1111' |
|         EAS_message_length /* N */ | 12 | uimsbf |
|         EAS_message_bytes() | 8*N | var |
|       } | | |
|       else if(EAS_message_transfer_type == 0x03) { | | |
|         IP_address | 32 or 128 | uimsbf |
|         UDP_port_num | 16 | uimsbf |
|       } | | |
|       EAS_NRT_service_id | 16 | uimsbf |
|     } | | |
| } | | |

FIG. 7

| Value | Designation |
|---|---|
| 0x00 | Not Specified |
| 0x01 | There is no alert message. Only NRT files are being sent without any alert message. |
| 0x02 | Alert message bytes shall be included in the EAT-MH. Alert message shall be transferred through the following EAS_message_ message_bytes() field in the message loop of the EAT-MH. |
| 0x03 | Alert message shall be transferred through IP datagram. |
| 0x04~0x07 | Reserved for future use |

FIG. 8

| Syntax | No. Bits | Format |
|---|---|---|
| EAS_content_IP_datagram() { | | |
| IP_header | | |
| UDP_header | | |
| EAS_message_id | 32 | uimsbf |
| current_sequence_number | 8 | uimsbf |
| last_sequence_number | 8 | |
| content_ID | 8 | uimsbf |
| content_payload() | N | var |
| } | | |

FIG. 9

| EAS_content_transfer_structure() { | | |
|---|---|---|
| num_of_contents | 8 | |
| for(i=0;i<num_of_contents;i++){ | | |
|    content_ID | 8 | uimsbf |
|    IP_address | 32or128 | uimsbf |
|    Port_number | 16 | uimsbf |
|    content_name_ext_length /*N*/ | 8 | |
|    content_name_ext_bytes() | 8*N | |
|    expiration_time | 32 | |
|    geocode_count /*M*/ | 8 | |
|    for(j=0;j< geocode_count;j++){ | | |
|      geocode | 24*M | |
|    } | | |
| } | | |
| } | | |

FIG. 10

| Syntax | No. Bits | Format |
|---|---|---|
| EAT_MH_section() () { | | |
|     table_id | 8 | 0xEA |
|     (same as above) | (same as above) | (same as above) |
|     num_EAS_messages | 8 | uimsbf |
|     for (m=0; m< num_EAS_messages; m++) { | | |
|         EAS_message_id | 32 | uimsbf |
|         reserved | 7 | '1111111' |
|         type_of_responder | 2 | uimsbf |
|         EAS_IP_version_flag | 1 | bslbf |
|         EAS_message_transfer_type | 3 | uimsbf |
|         EAS_message_encoding_type | 3 | uimsbf |
|         if(type_of_responder == 0x01 \| 0x03){ | | |
|             reserved | 10 | '1111111111' |
|             type_of_disciplines | 6 | uimsbf |
|         } | | |
|         if(EAS_message_transfer_type == 0x01) { | | |
|             EAS_content_transfer_structure() | | var |
|         } | | |
|         else if(EAS_message_transfer_type == 0x02) { | | |
|             reserved | 4 | '1111' |
|             EAS_message_length /* N */ | 12 | uimsbf |
|             EAS_message_bytes() | 8*N | var |
|         } | | |
|         else if(EAS_message_transfer_type == 0x03) { | | |
|             IP_address | 32 or 128 | uimsbf |
|             UDP_port_num | 16 | uimsbf |
|         } | | |
|         else if(EAS_message_transfer_type == 0x04) { | | |
|             reserved | 4 | '1111' |
|             EAS_message_length /* N */ | 12 | uimsbf |
|             EAS_message_bytes() | 8*N | var |
|             EAS_content_transfer_structure() | | var |
|         } | | |
|     } | | |
| } | | |

FIG. 11

| Value | Designation |
|---|---|
| 0x00 | Not Specified |
| 0x01 | There is no alert message. Only rich media files are being sent without any alert message. |
| 0x02 | Alert message bytes shall be included in the EAT-MH. Alert message shall be transferred through the following EAS_message_bytes() field in the message loop of the EAT-MH. |
| 0x03 | Alert message shall be transferred through IP datagram. |
| 0x04 | Alert message + EAS Rich Media Contents |
| 0x05~0x07 | Reserved for future use |

FIG. 12

| Syntax | No. Bits | Format |
|---|---|---|
| emergency_alert_IP_datagram() { | | |
|   IP_header | | |
|   UDP_header | | |
|   EAS_message_id | 32 | uimsbf |
|   EAS_message_length | 16 | uimsbf |
|   EAS_message_bytes() | N | var |
|   EAS_content_transfer_structure() | | |
| } | | |

FIG. 13

| | | |
|---|---|---|
| EAS_content_transfer_extended_structure() { | | |
|   num_of_contents | 8 | |
|   for(i=0;i<num_of_contents;i++){ | | |
|     EAS_content_IP_datagram_type | 8 | |
|     if(EAS_content_IP_datagram_type == 0x01){ | | |
|       TSI | 16 | |
|       TOI | 16 | uimsbf |
|     } | | |
|     else if(EAS_content_IP_datagram_type == 0x02){ | | |
|       content_ID | 8 | |
|       original_content_length | 32 | uimsbf |
|       original_content_type | 8 | uimsbf |
|       transfer_content_length | 32 | uimsbf |
|       transfer_content_type | 8 | uimsbf |
|       reserved | 7 | '1111111' |
|       encrypted_flag | 1 | bslbf |
|       if(encrypted_flag=1) | | |
|         encryption_method | 8 | uimsbf |
|       content_name_length /*N*/ | 8 | uimsbf |
|       content_name_bytes() | 8*N | var |
|     } | | |
|     IP_address | 32or128 | uimsbf |
|     Port_number | 16 | uimsbf |
|     expiration_time | 32 | uimsbf |
|     geocode_count /*M*/ | 8 | uimsbf |
|     for(j=0;j<geocode_count;j++){ | | |
|       geocode | 24*M | var |
|     } | | |
|   } | | |
| } | | |

FIG. 14

| Value | Designation |
|---|---|
| 0x00 | Not Specified |
| 0x01 | IP datagram carrying EAS Rich Media Content is transferred through FLUTE |
| 0x02 | IP datagram carrying EAS Rich Media Content is transferred through structure defined in the present invention |
| 0x03~0xFF | Reserved for future use |

APPARATUS FOR PROVIDING URGENT ALARM SERVICE THROUGH BROADCAST SYSTEM AND METHOD THEREFOR

This application is a Continuation Application of U.S. patent application Ser. No. 15/259,643 filed Sep. 8, 2016, now allowed, which is a Continuation Application of U.S. patent application Ser. No. 14/765,257 filed Jul. 31, 2015, now U.S. Pat. No. 9,467,240, which is a National Stage Entry of International Application No. PCT/KR2014/000908 filed Feb. 3, 2014, which claims priority to U.S. Provisional Application No. 61/760,158 filed Feb. 3, 2013, all of which are incorporated by reference for all purposes as if fully set forth herein.

TECHNICAL FIELD

The present invention relates to a broadcasting system. More particularly, the present invention relates to a method and apparatus for providing an emergency alert service through a broadcasting system.

BACKGROUND ART

With the development of portable devices, mobile devices have become able to transmit/receive broadcasts. Accordingly, a broadcast signal transmission system suitable for a mobile broadcast environment has been constructed. In addition, natural disasters and man-made disasters occur all over the world. It is necessary to rapidly provide information regarding such disasters. For mobile broadcasts, the positions at which users view the broadcasts may vary, and disasters are closely related to location. Consequently, it is effective to provide information regarding disasters through mobile broadcasts. However, there has not been developed any technology that is capable of providing information regarding disasters in the current mobile broadcasting system.

In addition, a broadcast receiver may not receive specific services due to the characteristics of the broadcast receiver. For example, a Non Real Time (NRT) broadcast service and/or an Electronic Service Guide (ESG) service, which has been recently developed, cannot be received by an old-fashioned broadcast receiver that was manufactured before the development and commercialization of such services. Technology for providing information regarding disasters through such services is under consideration. In this case, however, it is not possible for the old-fashioned broadcast receiver to receive information regarding disasters.

DISCLOSURE

Technical Problem

An object of the present invention devised to solve the problem lies on the provision of an efficient emergency alert service in a broadcasting system.

Another object of the present invention devised to solve the problem lies on the provision of an efficient emergency alert service in a broadcasting system having a combination of fixed broadcasting and mobile broadcasting.

A further object of the present invention devised to solve the problem lies on the provision of an emergency alert service to an old-fashioned broadcast receiver.

Technical Solution

The object of the present invention can be achieved by providing an emergency alert content receiving method using a broadcasting system including receiving a broadcast signal, parsing an emergency alert table contained in the broadcast signal, the emergency alert table including an emergency alert message and an emergency alert content transfer structure descriptor for signaling information regarding emergency alert content related to the emergency alert message, the emergency alert content transfer structure descriptor including IP address information of an IP datagram for transferring the emergency alert content, receiving the IP datagram of the IP address information, and decoding the IP datagram to reproduce the emergency alert content.

The emergency alert content transfer structure descriptor may further include content ID information for identifying the emergency alert content related to the emergency alert message, expiration time information of the emergency alert content, and number information indicating the number of pieces of the emergency alert content related to the emergency alert message.

The emergency alert content transfer structure descriptor may further include area information for identifying an area to which the emergency alert content is to be provided and area number information indicating the number of pieces of the area information.

The IP datagram for transferring the emergency alert content may further include emergency alert message ID information for identifying the emergency alert message related to the emergency alert content.

The IP datagram for transferring the emergency alert content may further include content ID information for identifying the emergency alert content and data of the emergency alert content.

The IP datagram for transferring the emergency alert content may further include current sequence number information indicating a sequence number of the IP datagram and last sequence number information indicating a last sequence number of the IP datagram for the emergency alert content.

In another aspect of the present invention, provided herein is an emergency alert content receiving method using a broadcasting system including receiving a broadcast signal, parsing an emergency alert table contained in the broadcast signal, the emergency alert table including first IP address information for identifying an IP address of a first IP datagram for transferring an emergency alert message, receiving the first IP datagram using the first IP address information, the first IP datagram including an emergency alert content transfer structure element for signaling information regarding emergency alert content related to the emergency alert message, the emergency alert content transfer structure element including second IP address information for identifying an IP address of a second IP datagram for transferring the emergency alert content, receiving the second IP datagram using the second IP address information, and decoding the second IP datagram to reproduce the emergency alert content.

The emergency alert content transfer structure element may further include content ID information for identifying the emergency alert content related to the emergency alert message, expiration time information of the emergency alert content, and number information indicating the number of pieces of the emergency alert content related to the emergency alert message.

The emergency alert content transfer structure element may further include area information for identifying an area to which the emergency alert content is to be provided and area number information indicating the number of pieces of the area information.

The first IP datagram may further include first emergency alert message ID information for identifying the emergency alert message, length information indicating a length of the emergency alert message, and data of the emergency alert message.

The second IP datagram may further include second emergency alert message ID information for identifying the emergency alert message related to the emergency alert content.

The second IP datagram may further include content ID information for identifying the emergency alert content and data of the emergency alert content.

The second IP datagram may further include current sequence number information indicating a sequence number of the second IP datagram and last sequence number information indicating a last sequence number of the second IP datagram for the emergency alert content.

The emergency alert content transfer structure element may further include emergency alert content IP datagram type information for identifying whether the second IP datagram is transferred in a FLUTE mode.

The emergency alert content transfer structure element may further include size information of the emergency alert content in an original state, content type information of the emergency alert content in an original state, size information of the emergency alert content in a modified state for transfer, and content type information of the emergency alert content in a modified state for transfer.

In a further aspect of the present invention, provided herein is a receiver for receiving emergency alert content, wherein the receiver includes at least one device or unit for performing each of the above-described methods.

Advantageous Effects

The present invention has an effect in that a receiver that does not support an ESG/NRT (or an old-fashioned receiver) can receive/reproduce interactive content including an emergency alert service.

The present invention has the effect of reducing the size of a legacy signaling table (e.g. Service Map Table; SMT).

DESCRIPTION OF DRAWINGS

FIG. 6 is a view showing the syntax of a mobile emergency alert table according to an embodiment of the present invention.

FIG. 7 is a view showing the designations of values of an EAS_message_transfer_type field according to an embodiment of the present invention.

FIG. 8 is a view showing the structure of an IP datagram that transfers emergency alert content according to an embodiment of the present invention.

FIG. 9 is a view showing the syntax that signals emergency alert content according to an embodiment of the present invention.

FIG. 10 is a view showing an emergency alert table according to another embodiment of the present invention.

FIG. 11 is a view showing the designations of values of an EAS_message_transfer_type field according to another embodiment of the present invention.

FIG. 12 is a view showing an emergency alert IP datagram according to an embodiment of the present invention.

FIG. 13 is a view showing EAS_content_transfer_extended_structure( ) according to an embodiment of the present invention.

FIG. 14 is a view showing the designations of values of an EAS_content_IP_datagram_type element according to an embodiment of the present invention.

BEST MODE

Figure 1:
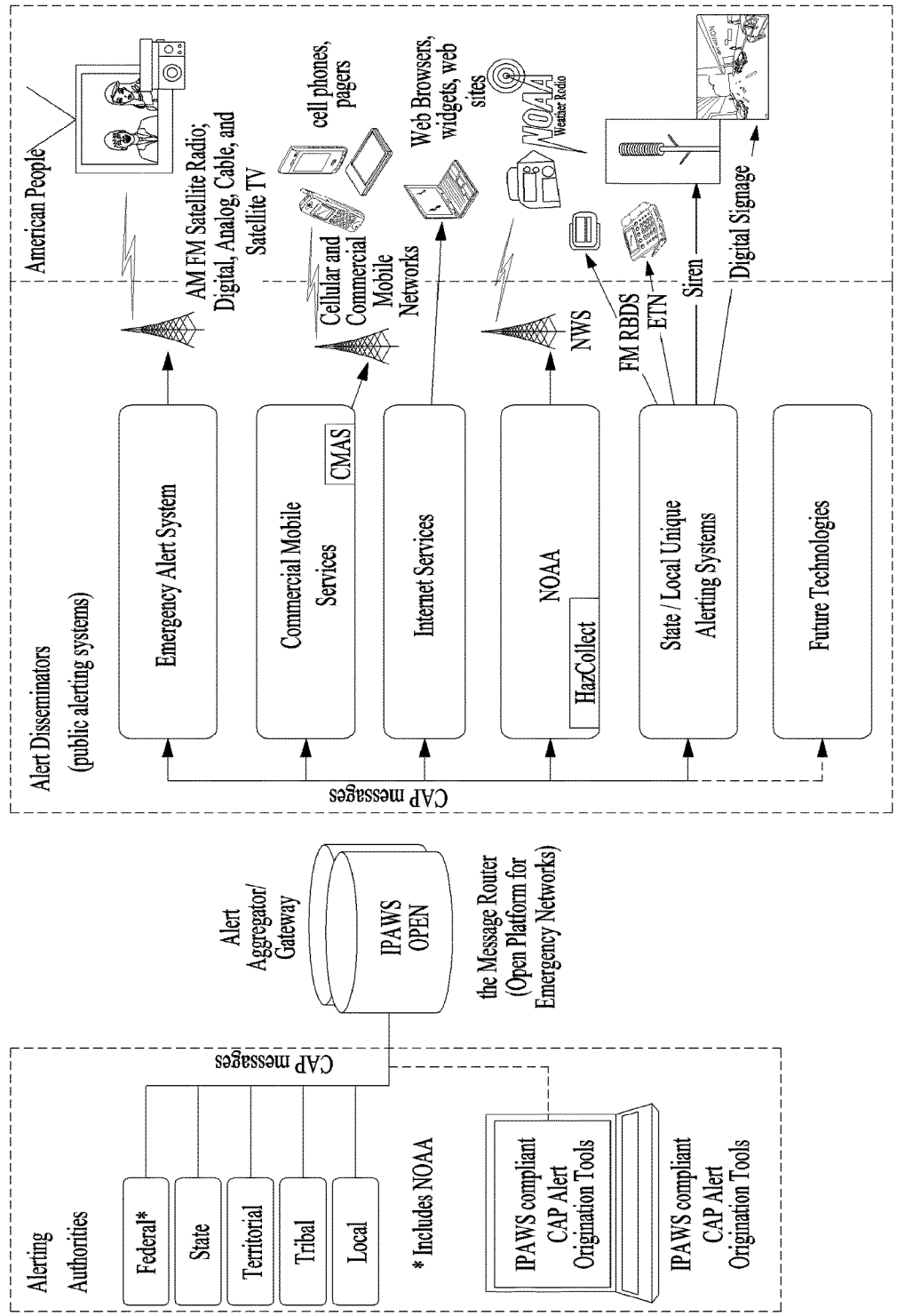
FIG. 1 is a view showing the structure of an integrated public alert and warning system according to an embodiment of the present invention.

Reference will now be made in detail to the preferred embodiments, examples of which are illustrated in the accompanying drawings. It should be noted herein that these embodiments are only for illustrative purposes and the protection scope of the present specification is not limited or restricted thereto.

The terms used in the present specification are general terms selected in consideration of functions and widely used at the present time. However, such terms may vary depending upon intentions of those skilled in the art to which the present specification pertains, usual practices, or appearance of new technology. In a specific case, some terms may be selected by the applicant of the present application. In this case, meanings of such terms will be described in corresponding paragraphs of the present specification. Therefore, it should be noted that the terms used in present specification be interpreted based on real meanings of the terms and the present specification, not simple names of the terms.

For easy understanding of the present invention and the convenience of description, terms and abbreviations are defined as follows.

Among the terms used in the description of the present invention, main service data correspond to data that are received by a fixed broadcast receiving system, and may include audio/video data. More specifically, the main service data may include High Definition (HD) or Standard Definition (SD) audio/video data, and may include various kinds of data for broadcasting.

Known data correspond to data that are pre-known in accordance with an agreement between a broadcast receiving system and a broadcast transmitting system.

The term "MH" corresponds to mobile/handheld, and represents the opposite concept of a fixed-type system. More specifically, MH service data (or mobile service data) may include any data used in a mobile or portable system. Therefore, mobile service data according to an embodiment of the present invention are not limited to the MH service data.

Mobile service data may include information, such as program execution files or stock information. The mobile service data may include audio/video data. Most specifically, the mobile service data may correspond to audio/video data having a lower resolution and a lower data rate when compared with the main service data. For example, in a case in which an MPEG-2 codec is used as an audio/video codec for main services, an audio/video codec, such as an MPEG-2 codec, MPEG-4 advanced video coding (AVC), or scalable video coding (SVC), having a higher image compression rate may be used for the mobile services.

The mobile service data may include transport protocol expert group (TPEG) data for broadcasting real-time transportation information. Alternatively, the mobile service data may include broadcast services/programs, such as weather forecast services, traffic information services, stock information services, viewer participation quiz programs, real-time polls and surveys, interactive education broadcast programs, gaming services, or music programs.

In the present invention, a data group (or an MH group) means a set of data packets that are transmitted through a data slot (or an MH slot).

A data group division refers to a set of data group regions in a slot. The data group division may be categorized as a primary data group division or a secondary data group division. A set of primary data group divisions in an MH frame forms a primary parade, and a set of secondary data group divisions forms a secondary parade.

A parade (or an MH parade) refers to a set of data groups that have the same FEC parameters. Alternatively, the parade may refer to a set of data group divisions of data groups having the same data group type.

A Reed-Solomon (RS) frame is a two-dimensional data frame. An RS frame payload is encoded using Reed Solomon-Cyclic Redundancy Check (RS-CRC) coding.

An ensemble (an M/H ensemble) refers to a set of RS frames having the same FEC codes applied thereto. Each RS frame includes a set of IP streams in a compressed state. The ensemble may include mobile service data for mobile services and a mobile service signaling channel for signaling of the mobile services.

In an embodiment of the present invention, mobile service data for mobile services may be transmitted through a portion of a transmission channel that is used to transmit main service data. Alternatively, mobile service data for mobile services may be transmitted using the entire transmission channel that was used for main services. Data required for mobile services may be referred to as mobile service data. Accordingly, the mobile service data may include known data, signaling data, or/and RS parity data.

The mobile service data may be categorized into mobile service data of Core Mobile Mode (CMM) and mobile service data of Scalable Full Channel Mobile Mode (SFCMM).

The CMM is a broadcasting mode for transmitting main service data and mobile service data together. For example, the CMM may use at least 38 of 156 packets in each slot to transmit main service data for legacy broadcasting.

The SFCMM is a broadcasting mode for transmitting only mobile service data or transmitting mobile service data together with a smaller amount of main service data in the CMM. For example, the SFCMM may use less than 38 of the 156 packets in each slot to transmit main service data.

An SFCMM parade refers to a parade that is backward compatible with, but not recognizable by, a legacy CMM system/decoder.

A data group region refers to a set of data blocks or extended data blocks. The data group region refers to a predetermined region in a data group. Each data group region may include mobile service data for different uses.

A transmission parameter channel (TPC) may be included in each data group. The TPC transmits information regarding a data frame and a data group to a reception side, and provides transmission parameters.

A fast information channel (FIC) transmits cross layer information (or interlayer information). The FIC may include connection information between ensembles and mobile services.

In the present invention, an emergency alert message refers to text announcing disasters or emergencies or simple images that clearly show disasters or emergencies.

In the present invention, emergency alert content means all files, such as images, audio, video, and text, which are capable of providing detailed information regarding disasters or emergencies to users. The emergency alert content may be transferred as EAS Rich Media Content. Rich Media Content may mean content for which an interactive service is possible. Accordingly, the EAS Rich Media Content may mean emergency alert content for which an interactive service is possible. The emergency alert content may include emergency alert messages.

FIG. 1 is a view showing the structure of an integrated public alert and warning system according to an embodiment of the present invention.

An integrated public alert and warning system (IPAWS) according to an embodiment of the present invention is an alert and warning system to which an emergency alert management system of Federal Emergency Management Agency (FEMA) is applicable.

The Federal Emergency Management Agency (FEMA) is a federal agency for emergency management in the US. FEMA is designing and developing the structure of an integrated system that is capable of providing effective and reliable disaster alert through various communication schemes.

In a case in which a disaster has occurred or may occur, authorities having rights to issue a disaster alert create alert messages based on Common Alerting Protocol (CAP), which is a common format for the alert messages. The created CAP messages are transferred to various disaster alert and warning systems, such as a Commercial Mobile Alert System (CMAS), through Open Platform for Emergency Networks (OPEN), integrated networks for transferring various alert messages, which are being developed by the IPAWS. Each disaster alert and warning system processes the CAP messages based on the purpose and use of the system, and provide a disaster alert service corresponding thereto.

For example, the CMAS may select a message suitable for a corresponding provider network from among the received alert messages, may extract text having 90 letters or fewer from the selected message, and may provide a disaster alert service in the form of a text message.

Figure 2:
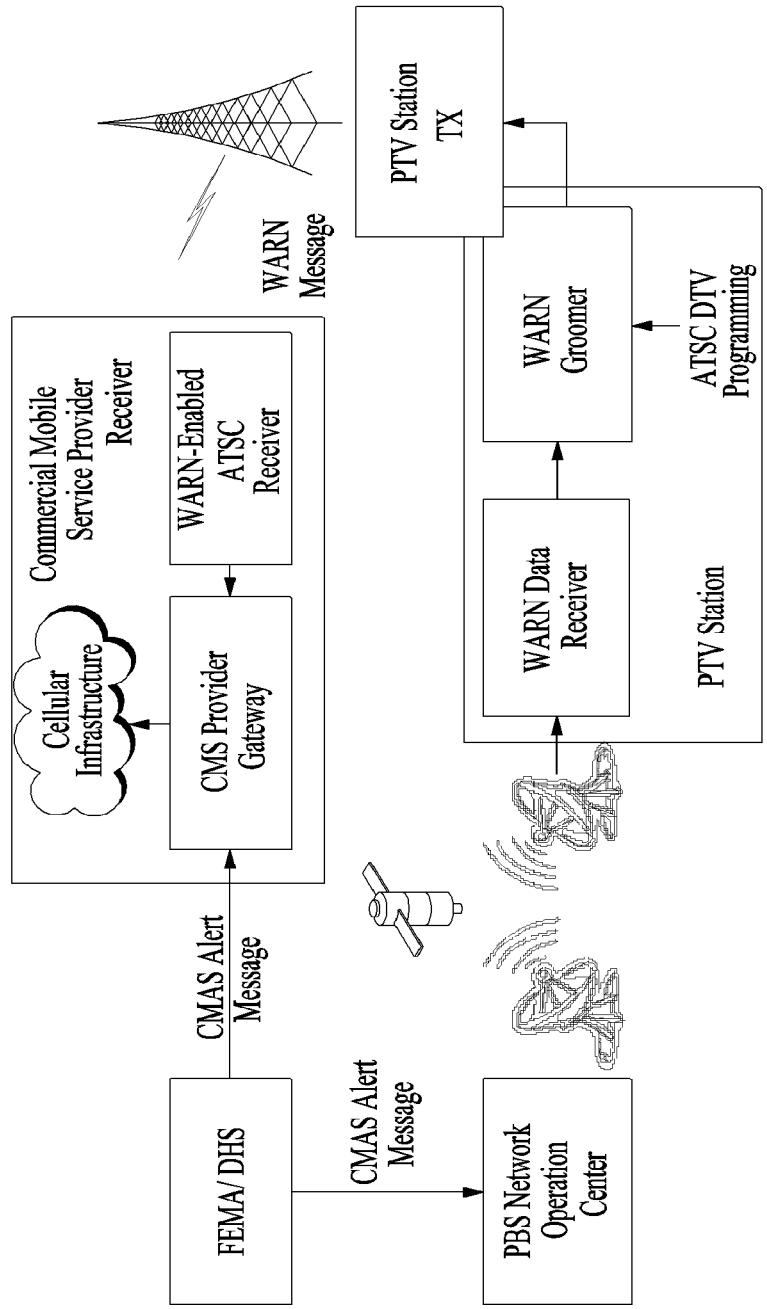
FIG. 2 is a view showing an alert network according to an embodiment of the present invention.

FIG. 2 is a view showing an alert network according to an embodiment of the present invention.

An alert network according to an embodiment of the present invention may be based on a Public Broadcasting Service Warning, Alert, and Response Network (PBS WARN).

The PBS receives the created Commercial Mobile Alert System (CMAS) alert message from FEMA, and relays the received alert message to broadcasting media and communication providers. The communication providers extract text having 90 letters or fewer from the received alert message, and provide a disaster alert service in the form of a text message.

The CMAS receives the created alert message from the FEMA, and provide a disaster alert message service based on text having 90 letters or fewer. As a backup network for transferring the CMAS alert message, the PBS transfers the alert message in a state of being included as a portion of an airwave through a Network Operation Center. A PTV station receives the alert message together with a corresponding broadcast signal, and resends the received alert message to a local broadcasting network. In addition, the PTV station receives the resent alert message through a WARN-Enabled Receiver that is capable of performing processing thereof, extracts text from the received alert message, and provides a disaster alert service based on a text message to users in the communication network.

Figure 3:
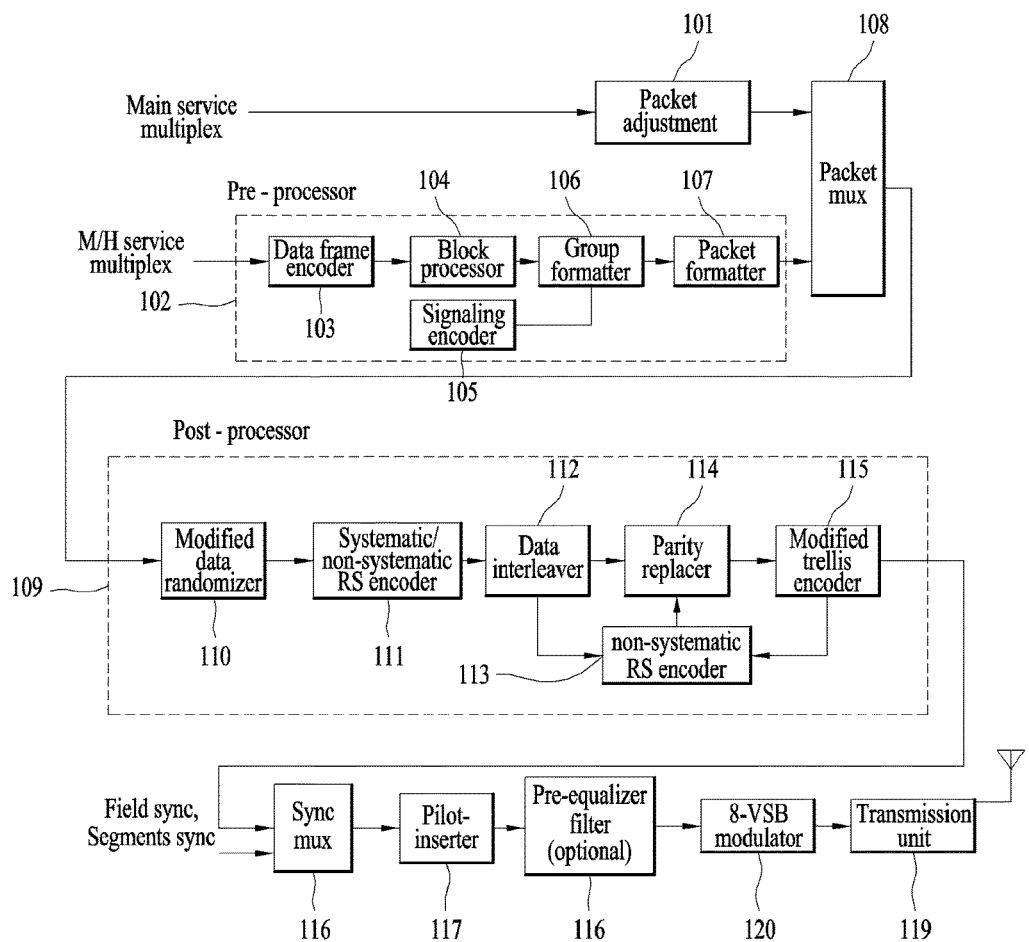
FIG. 3 is a view showing a transmission system according to an embodiment of the present invention.

FIG. 3 is a view showing a transmission system according to an embodiment of the present invention.

A transmission system according to an embodiment of the present invention includes a packet adjustment unit 101, a pre-processor 102, a data frame encoder 103, a block processor 104, a signaling encoder 105, a group formatter 106, a packet formatter 107, a packet multiplexer 108, a post-processor 109, a modified data randomizer 110, a systematic/non-systematic RS encoder 111, a data interleaver 112, a non-systematic RS encoder 113, a parity replacer 114, a modified trellis encoder 115, a synchronization multiplexer 116, a pilot inserter 117, a VSB modulator 118, and/or a transmission unit 119. The transmission system according to the present invention may further include a pre-equalizer filter 120.

The packet adjustment unit 101 may compensate for the difference in position which may exist between a service stream including a mobile service stream and a service stream not including a mobile service stream.

The pre-processor 102 may function to form mobile service data so as to have a mobile service structure for transmitting mobile service data. The pre-processor 102 may perform additional FEC coding on the mobile service data. The pre-processor 102 may insert know data into a gate group. The pre-processor 102 improves the transmission and reception performance of mobile service data in a mobile environment.

The pre-processor 102 may include a data frame encoder 103, a block processor 104, a signaling encoder 105, a group formatter 106, a packet formatter 107, and/or a packet multiplexer 108.

The data frame encoder 103 randomizes mobile service data, and performs RS encoding and Cyclic Redundancy Check (CRC) encoding for the mobile service data. The data frame encoder 103 creates an RS frame including the mobile service data. The data frame encoder 103 may include an RS frame divider (not shown) for separating the RS frame to create an RS frame portion.

The block processor 104 converts the RS frame portion into a Serial Concatenated Convolutional Coding (SCCC) block. The block processor 104 converts bytes of the mobile service data included in the SCCC block into bit-unit mobile service data. The block processor 104 performs ½, ⅓, or ¼ rate Convolutional Coding for the bit-unit mobile service data. In this case, a ½ rate means that when one bit is input, two bits are output, a ⅓ rate means that when one bit is input, three bits are output, and a ¼ rate means that when one hit is input, four bits are output. The output hits may be included in a symbol. The block processor 104 performs interleaving for the symbol that is convolutional-encoded and output. The block processor 104 converts the interleaved symbol into byte-unit data. The block processor 104 converts the SCCC block into a data block.

The signaling encoder 105 creates signaling information for signaling on a receiving side. The signaling encoder 105 performs FEC coding and Parallel Concatenated Convolutional Code (PCCC) encoding for the signaling information. The signaling information includes TPC data and/or FIC data.

The group formatter 106 forms a data group including mobile service data. The group formatter 106 inserts FEC-coded mobile service data into an interleaved data group. The group formatter 106 inserts initialization data bytes for initializing a memory of the signaling data modified trellis encoder 115 and/or a known data string (s set of successive known data) into a data group. The group formatter 106 inserts a position holder for main service data, a position holder for an MPEG-2 header, and/or a position holder for non-systematic RS parity into a data group. The group formatter 106 may insert dummy data so as to create a desired data group. After inserting various kinds of data, the group formatter 106 performs de-interleaving for data in the interleaved data group. After performing de-interleaving, the data group is output into a data group before being interleaved. The data group created by the group formatter 106 includes mobile service data corresponding to one RS frame portion.

The packet formatter 107 converts output data from the group formatter 106 into Transport Stream (TS) packets. In this case, the TS packets may be referred to as mobile service data packets. The packet formatter 107 outputs (118+M) mobile service data packets for one data group, where M is an integer equal to or less than 38.

The packet multiplexer 108 multiplexes packets including mobile service data processed by the pre-processor 102 and packets including main service data. Packets multiplexed for one slot includes (118+M) mobile service data and L main service data packets. In an embodiment of the present invention, M is an integer between 1 and 38, and the sum of M and L is 38. In another embodiment, in a case in which the number of main service data packets is 0 (L=0), only the mobile service data are processed by the packet multiplexer 108.

The post-processor 109 processes mobile service data such that the mobile service data are backward compatible with a legacy broadcasting system. In this procedure, main service data may also be processed therewith. In an embodiment of the present invention, the post-processor 109 may include a modified data randomizer 110, a systematic/non-systematic RS encoder 111, a data interleaver 112, a non-systematic RS encoder 113, a parity replacer 114, and/or a modified trellis encoder 115.

The modified data randomizer 110 does not randomize mobile service data packets but bypasses the mobile service data packets. The modified data randomizer 110 randomizes main service data packets. In an embodiment of the present invention, in a case in which the data group created by the pre-processor 102 does not include main service data, the modified data randomizer 110 may not perform a randomizing procedure.

In a case in which input data are main service data packets, the systematic/non-systematic RS encoder 111 performs systematic RS encoding for main service data. In a case in which input data are mobile service data packets, the systematic/non-systematic RS encoder 111 performs non-systematic RS encoding for mobile service data. Systematic/non-systematic RS parity created by the systematic/non-systematic RS encoding may be inserted into a pre-defined position in a data group. In a case in which main service data packets are not included in service data packets multiplexed by the packet multiplexer 108, it is not necessary for the systematic/non-systematic RS encoder 111 to perform RS encoding for main service data. In this case, the systematic/non-systematic RS encoder 111 may not create non-systematic RS parity for backward compatibility.

The data interleaver 112 performs interleaving for data including main service data and mobile service data.

In a case in which it is necessary to initialize the modified trellis encoder 115, the non-systematic RS encoder 113 receives a memory value of the modified trellis encoder 115, receives mobile service data from the data interleaver 112, and changes initialization data of the mobile service data into the memory value. The non-systematic RS encoder 113 performs non-systematic RS encoding for the changed mobile service data, and outputs created RS parity to the parity replacer 114.

In a case in which it is necessary to initialize the modified trellis encoder 115, the parity replacer 114 receives mobile service data from the data interleaver 112, and replaces non-systematic RS parity of the mobile service data with non-systematic RS parity created by the non-systematic RS encoder 113.

In a case in which the packets multiplexed by the packet multiplexer 108 do not include main service data packets, it is not necessary to include RS parity for backward compatibility in the data group. In an embodiment of the present invention, therefore, in this case, the non-systematic RS encoder 113 and the parity replacer 114 may not perform the above-described operations but may bypass the received data.

The modified trellis encoder 115 performs trellis encoding for the output of the data interleaver 112. it is necessary to initialize a memory included in the modified trellis encoder 115 before trellis encoding so as to output known data based on agreement between a broadcast receiving side and a broadcast transmitting side after trellis encoding. The initialization operation may be commenced by initialization data included in the data group.

The synchronization multiplexer 116 inserts a field synchronization signal and a segment synchronization signal into output data from the modified trellis encoder 115, and multiplexes these data.

The pilot inserter 117 receives data multiplexed by the synchronization multiplexer 116, and inserts a pilot signal used as a carrier phase for demodulating a channel signal at a receiving side into the multiplexed data.

The VSB modulator 118 performs VSB modulation for transmitting broadcast data. According to circumstances, the VSB modulator 118 may be replaced with an OFDM modulator. That is, in a case in which modulation is performed in an OFDM mode, not in a VSB mode, the OFDM modulator may be included in the transmission system according to the present invention.

The transmission unit 119 performs frequency up-conversion for modulated data, and transmits the converted data.

In a transmission system according to an embodiment of the present invention, some of the devices may be omitted or replaced with other devices, and the processing sequence may also be changed.

Figure 4:
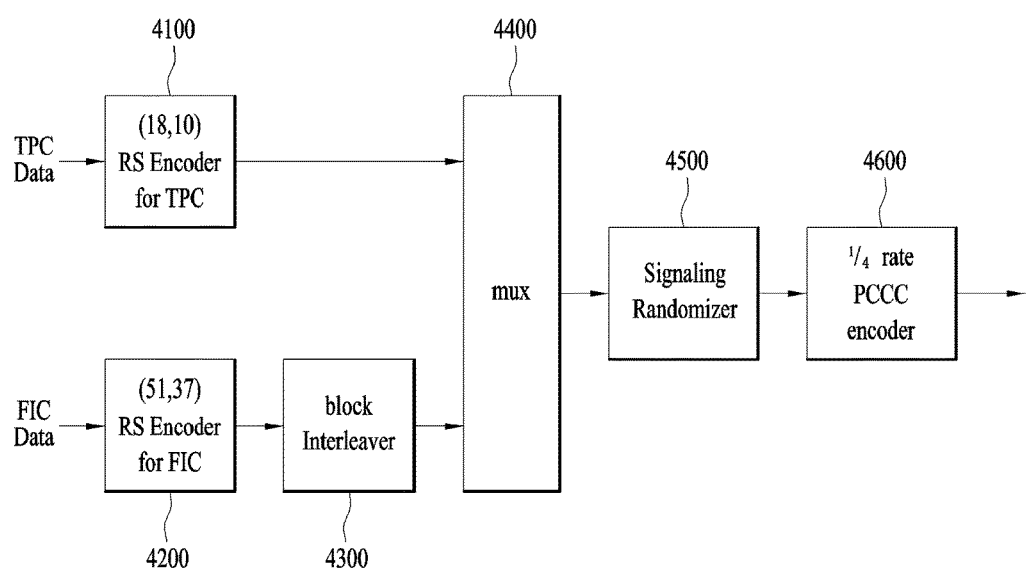
FIG. 4 is a view showing a signaling encoder according to an embodiment of the present invention.

FIG. 4 is a view showing a signaling encoder according to an embodiment of the present invention.

A signaling encoder according to an embodiment of the present invention includes a first RS encoder 4100, a second RS encoder 4200, a block interleaver 4300, a multiplexer 4400, a signaling randomizer 4500, and/or a PCCC encoder 4600.

The first RS encoder 4100 performs RS encoding for TPC data.

The second RS encoder 4200 performs RS encoding for FIC data. In an embodiment of the present invention, the first RS encoder 4100 and the second RS encoder 4200 perform RS encoding at different rates. That is, the TPC data and the FIC data are RS encoded at different rates.

The block interleaver 4300 performs block interleaving for the RS encoded FTC data. Block interleaving means interleaving the FIC data on a per block basis.

The multiplexer 4400 multiplexes the RS encoded TPC data and the block interleaved FIC data.

The signaling randomizer 4500 randomizes the multiplexed data.

The PCCC encoder 4600 performs PCCC encoding for the randomized data.

Figure 5:
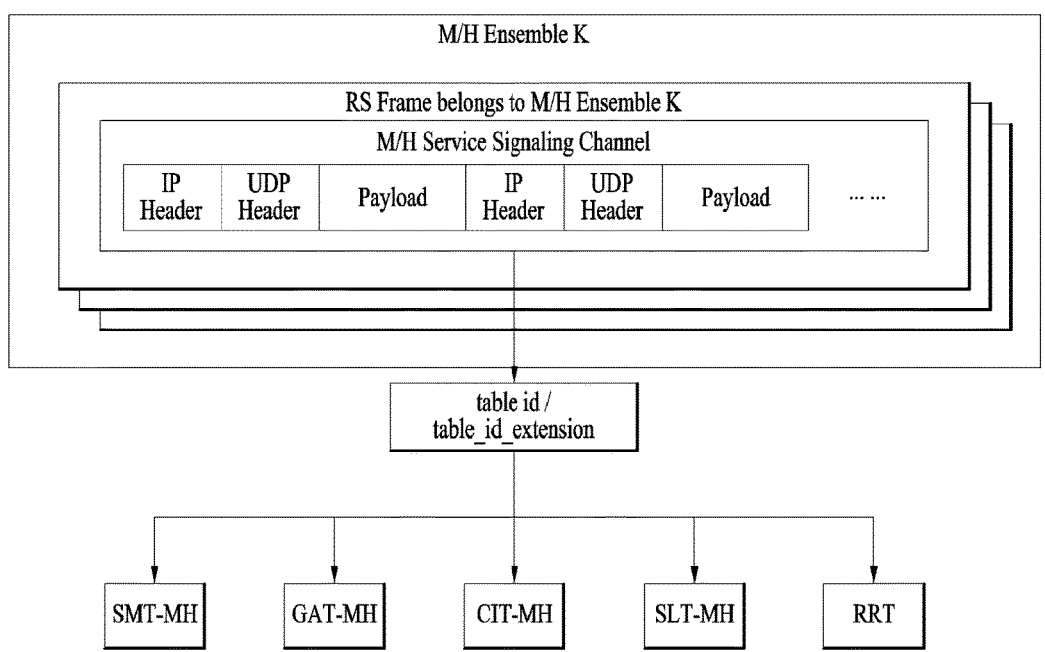
FIG. 5 is a view showing the structure of an ensemble according to an embodiment of the present invention.

FIG. 5 is a view showing the structure of an ensemble according to an embodiment of the present invention.

The ensemble transmits mobile service data constituting a mobile service. The ensemble may include a service signaling channel (SSC) for signaling the mobile service. The service signaling channel may be included in an IP datagram. The service signaling channel may be defined to so as be transmitted through a specific IP address and UDP port. That is, a receiving side may parse the IP address and UDP port to acquire service signaling channel data.

The service signaling channel may include a Service Map Table (SMT) including the attribute of a mobile service transmitted by the ensemble, a Guide Access Table (GAT) including information regarding service guide data for the mobile service, a Cell Information Table (CIT) providing carrier frequency information regarding an adjacent cell that transmits a similar service, a Service Labeling Table (SLT) including information for rapid mobile service scanning at a receiving side, a Rating Region Table (RRT) including viewing rating information for the mobile service, and/or an Emergency Alert Table-MH (EAT-MH) including information for transmitting an emergency alert service through mobile broadcasting.

FIG. 6 is a view showing the syntax of a mobile emergency alert table according to an embodiment of the present invention.

When used in a fixed broadcasting system, the mobile emergency alert table according to the present invention may be referred to as an emergency alert table.

The mobile emergency alert table according to the present invention may include a table_id field, an EAT_MH_protocol_version field, an ensemble_id field, an automatic_tuning_channel_number field, an automatic_tuning_ts_id field, an automatic_tuning_ensemble_id field, an automatic_tuning_service_id field, a num_EAS_messages field, an EAS_message_id field, a type_of_responder field, a type_of_disciplines field, an EAS_IP_version_flag field, an EAS_message_transfer_type field, an EAS_message_encoding_ type field, an EAS_message_length field, an EAS_message_bytes field, an IP_address field, a UDP_port_num field, and/or an EAS_NRT_service_id field.

The table_id field identifies the kind of the current table. The broadcast receiver may identify a table_id field having a specific value to identify that the current table is a mobile emergency alert table.

In a case in which the structure of the mobile emergency alert table is changed, the EAT_MH_protocol_version field identifies the version information of the mobile emergency alert table.

The ensemble_id field indicates an ID of an ensemble related to this table.

The automatic_tuning_channel_number field indicates a physical RF channel number for automatic tuning. For example, this field may be referred to in a case in which forced tuning to the number of a channel that is broadcasting an emergency alert message is necessary.

The automatic_tuning_ts_id field indicates a transport stream ID for automatic tuning. For example, in a case in which it is necessary to parse a transport stream including an emergency alert message, it is possible to identify the stream through this ID.

The automatic_tuning_ensemble_id field indicates an ID of an ensemble for automatic tuning. For example, an ensemble including an emergency alert message may be identified through this field.

The automatic_tuning_service_id field indicates a target A/V service of automatic tuning. In a case in which automatic tuning is designated in the mobile emergency alert table, the emergency alert table may or may not include an alert message. In a case in which the automatic tuning is designated, the broadcast receiver tunes to the target channel number without regard for the corresponding message.

The num_EAS_messages field indicates the number of emergency alert messages included in the mobile emergency alert table.

The EAS_message_id field identifies a unique ID for transmitting an emergency alert message. In a case in which the previous emergency alert message is updated or canceled, the value of this field may be changed. In another embodiment, this field may be extracted from an ID of a CAP message.

The type_of_responder field indicates a responder of the emergency alert message.

The type_of_disciplines field indicates information regarding an emergency for which an emergency alert is issued.

The EAS_IP_version_flag field indicates that in a case in which the EAS_IP_version_flag field is set to '0', the IP_address field includes an IPv4 address, and in a case in which the EAS_IP_version_flag field is set to '1', the IP_address field is for IPv6.

The EAS_message_transfer_type field indicates the transfer type of an emergency alert message.

The EAS_message_encoding_type field indicates the encoding type of an emergency alert message.

The EAS_message_length field indicates the compressed length of a compressed emergency alert message including an emergency alert.

The EAS_message_bytes field indicates the size of a compressed emergency alert message including an emergency alert.

In a case in which an emergency alert message is transferred through an IP datagram, the IP_address field indicates a corresponding IP address.

In a case in which an emergency alert message is transferred through an IP datagram, the UDP_port_num field indicates a corresponding UDP address.

The EAS_NRT_service_id field identifies a service ID of an NRT service providing additional content related to an emergency alert message. This field may also be inserted into the SMT included in the ensemble transmitting the emergency alert table.

FIG. 7 is a view showing the designations of values of an EAS_message_transfer_type field according to an embodiment of the present invention.

The EAS_message_transfer_type field may indicate that the transfer type of an emergency alert message is not identified, an NRT file not including an alert message is transferred, an emergency alert message is transferred in a state of being included in a mobile emergency alert table, or an emergency alert message is transferred through an IP datagram, based on values of this field.

FIG. 8 is a view showing the structure of an IP datagram that transfers emergency alert content according to an embodiment of the present invention.

In an embodiment of the present invention, the mobile emergency alert system transfers EAS Rich Media Content (or emergency alert content) through an IP datagram without using an ESG/NRT. In an embodiment of the present invention, information related to the emergency alert content may be signaled through an EAT-MH (or EAT; Emergency Alert Table) such that any receiver that does not support an ESG/NRT may receive EAS Rich Media Content and provide information related thereto to users.

The EAS Rich Media Content means all files, such as images, audio, and video, which are capable of providing detailed information regarding disasters to users. The EAS Rich Media Content may include emergency alert content. Rich Media Content may mean content for which an interactive service is possible. Accordingly, the EAS Rich Media Content may mean emergency alert content for which an interactive service is possible. The emergency alert content may include emergency alert messages.

In the mobile broadcasting system, emergency alert messages or emergency alert content may be transferred using NRT. In this case, emergency alert messages or emergency alert content may be transferred through a FLUTE type IP datagram. In the present invention, it is required for any receiver which does not support NRT to receive emergency alert messages or emergency alert content, and therefore it is necessary to newly define the structure of an IP datagram that is capable of transferring EAS Rich Media Content.

The IP datagram that transfers emergency alert content according to the present invention may include an IP_header element, a UDP_header element, an EAS_message_id element, a current_sequence_number element, a last_sequence_number element, a content_ID element, and/or a content_payload( ) element.

The IP_header element includes an IP header.

The UDP_header element includes a UDP header.

The EAS_message_id element indicates an identifier (ID) of an emergency alert message (EAS message) related to EAS Rich Media Content.

The current_sequence_number element indicates the current sequence number of a received IP datagram.

The last_sequence_number element indicates the last sequence number of the received IP datagram.

The content_ID element indicates an identifier (ID) of content made by collecting received IP datagrams.

The content_payload( ) element transmits the actual content data. A number of sequences corresponding to the number identified by the last_sequence_number element may be collected to make a piece of content.

FIG. 9 is a view showing syntax that signals emergency alert content according to an embodiment of the present invention.

When EAS Rich Media Content is transferred through an IP datagram, information related thereto must be signaled in order for the receiver to receive content. In an embodiment of the present invention, the emergency alert system of the mobile broadcasting system may add information related to EAS Rich Media Content to an EAT-MH (or EAT) providing information related to emergency alert messages.

EAS_content_transfer_structure ( ) that signals emergency alert content according to an embodiment of the present invention may include a num_of_content field, a content_ID field, an IP_address field, a Port_number field, a content_name_ext_length field, a content_name_ext_bytes( ) field, an expiration_time field, a geocode_count field, and/or a geocode field.

The num_of_content field indicates the number of pieces of EAS Rich Media Content that are transferred.

The content_ID field indicates a unique ID of emergency alert content that are transferred.

The IP_address field indicates a destination IP address value of the emergency alert content.

The Port_number field indicates a destination Port value of the emergency alert content.

The content_name_ext_length field indicates the length of a string of the name and extension of the emergency alert content.

The content_name_ext_bytes( ) field indicates the name and/or extension of emergency alert content. For example, the name and extension may be divided as in "example.txt."

The expiration_time field indicates expiration time of emergency alert content.

The geocode_count field indicates the number of geo code values meaning the number of places at which emergency alert content will appear.

The geocode field indicates a geo code meaning a place at which emergency alert content will appear. For example, the geo code may be defined as FIPS code.

Although not shown, EAS_content_transfer_structure ( ) according to an embodiment of the present invention may further include a content_type field and/or a related_content field.

The content_type field indicates the type of emergency alert content. For example, the content_type field may indicate whether emergency alert content is audio content, video content, and/or text content.

The related_content field includes information regarding emergency alert content related to emergency alert content identified by content_ID. For example, the related content field may include a relate_content_address field and/or a relate_content_type field. The relate_content_address field indicates an IP address and/or UDP port address for transferring emergency alert content related to emergency alert content identified by content_ID. The relate_content_type field indicates the type of emergency alert content related to emergency alert content identified by content_ID.

For the disabled who cannot recognize visual information, an address that provides audio-based emergency alert content related to emergency alert content that has a combination of video and audio elements may be accessed using information of the related_content( ) field in order to receive the corresponding emergency alert content. For the disabled who cannot recognize audio information, on the other hand, an address that provides video-based emergency alert content related to emergency alert content that has a combination of video and audio elements may be accessed in order to receive the corresponding emergency alert content.

FIG. 10 is a view showing an emergency alert table according to another embodiment of the present invention.

According to another embodiment of the present invention, signal information related to EAS Rich Media Content transferred through an IP datagram may be signaled through an emergency alert table. According to the present invention, the emergency alert table may be transmitted through the IP datagram, and information regarding corresponding emergency alert content may be signaled through the emergency alert table.

The description of fields included in an emergency alert table according to another embodiment of the present invention are substituted by that of the fields given with reference to FIG. 6.

However, an emergency alert table according to another embodiment of the present invention may include EAS_content_transfer structure ( ) previously described with reference to FIG. 9.

FIG. 11 is a view showing the designations of values of an EAS_message_transfer_type field according to another embodiment of the present invention.

According to another embodiment of the present invention, a value of "0x04" may be added to EAS_message_transfer_type of the emergency alert table so as to transfer EAS Rich Media Content. In a case in which the value of EAS_message_transfer_type is "0x04," it means that EAS message, content, and related information (and/or transfer information) are described in the emergency alert table.

According to another embodiment of the present invention, the EAS_message_transfer_type field may indicate that the transfer type of an emergency alert message is not identified, an Rich Media Content file including no alert message is transferred, an emergency alert message is transferred in a state of being included in an emergency alert table, an emergency alert message is transferred through an IP datagram, or EAS Rich Media Content is transferred together with an emergency alert message, based on values of this field.

FIG. 12 is a view showing an emergency alert IP datagram according to an embodiment of the present invention.

As previously described, an EAS_message_transfer_type field of an EAT-MH (or an emergency alert table) may indicate that an emergency alert message is being transferred through an IP datagram in the emergency alert system. In this case, the structure of the IP datagram that transfers the emergency alert message is signaled to the emergency alert table.

In an embodiment of the present invention, the IP datagram may signal information regarding emergency alert messages or emergency alert content. At this time, the IP datagram may include EAS_content_transfer_structure( ).

An IP datagram that signals information regarding emergency alert messages or emergency alert content according to an embodiment of the present invention may include an IP_header element, a UDP_header element, an EAS_message_id element, an EAS_message_length element, an EAS_message_bytes( ) element, and/or an EAS_content_transfer structure( ) element.

The IP_header element includes an IP header.

The UDP_header element includes a UDP header.

The EAS_message_id element indicates an identifier (ID) of an emergency alert message (EAS message) related to the EAS Rich Media Content that is transferred.

The EAS_message_length element indicates the length of an emergency alert message.

The EAS_message_bytes( ) element transfers data of an emergency alert message.

The EAS_content_transfer_structure( ) element may include EAS_content_transfer_structure( ) which was previously described with reference to FIG. 9.

FIG. 13 is a view showing EAS_content_transfer_extended_structure( ) according to an embodiment of the present invention.

According to an embodiment of the present invention, EAS Rich Media Content is transferred in the form of a file, and therefore it is possible to transfer EAS Rich Media Content in a transfer mode referred to as FLUTE. In this case, it is necessary to identify whether emergency alert content is transferred through a FLUTE type IP datagram. Accordingly, an embodiment of the present invention proposes an extended signaling structure of EAS_content_transfer_structure( ) which was previously described.

EAS_content_transfer_extended_structure( ) according to an embodiment of the present invention may define an additional IP datagram for signaling, and may perform signaling through the corresponding IP datagram. Alternatively, EAS_content_transfer_extended_structure( ) may be included in an emergency alert table.

EAS_content_transfer_extended_structure( ) according to an embodiment of the present invention may include a num_of_content element, an EAS_content_IP_datagram_type element, a TSI element, a TOI element, a content_ID element, an original_content_length element, an original_content_type element, a transfer_content_length element, a transfer_content_type element, an encrypted_flag element, an encryption_method element, a content_name_length element, a content_name_bytes( ) element, an IP_address element, a Port_number element, an expiration_time element, a geocode_count element, and/or a geocode element.

The num_of_content element indicates the number of pieces of EAS Rich Media Content that are transferred.

The EAS_content_IP_datagram_type element indicates the structure of an IP datagram carrying EAS Rich Media Content. The details thereof will hereinafter be described.

In a case in which EAS Rich Media Content is transferred through a FLUTE type IP datagram, the TSI element indicates a value coinciding with TSI described in a File Delivery Table (FDT). The TSI element may function to connect a signaling structure, in which EAS_content_transfer_extended_structure( ) is included, to the FDT.

In a case in which EAS Rich Media Content is transferred through a FLUTE type IP datagram, the TOI element indicates a value coinciding with TOI described in the FDT. The TOI element may function to connect a signaling structure in which EAS_content_transfer_extended_structure( ) is included to the FDT.

The content_ID element indicates a unique ID of EAS Rich Media Content (or content) that is transferred.

The original_content_length element indicates the original length of EAS Rich Media Content (or content).

The original_content_type element indicates the original type of EAS Rich Media Content. The original_content_type element may indicate compression type applied to EAS Rich Media Content, or may indicate a kind (audio, video, or images) of content.

The transfer_content_length element indicates the length of EAS Rich Media Content that is transferred.

The transfer_content_type element indicates the type of EAS Rich Media Content that is transferred. The EAS Rich Media Content may be transferred in Gzip form.

The encrypted_flag element indicates whether EAS Rich Media Content has been encrypted.

In a case in which the EAS Rich Media Content has been encrypted, the encryption_method element includes information that identifies a corresponding encryption method.

The content_name_length element indicates the length of a name string of EAS Rich Media Content.

The content_name_bytes( ) element indicates the name of EAS Rich Media Content.

The IP_address element indicates a destination IP address value of EAS Rich Media Content.

The Port_number element indicates a destination Port value of EAS Rich Media Content.

The expiration_time element indicates expiration time of EAS Rich Media Content.

The geocode_count element indicates the number of geo code values meaning a place at which EAS Rich Media Content will appear.

The geocode element indicates geo code meaning a place at which EAS Rich Media Content will appear. For example, the geocode element may be defined as FIPS code.

FIG. 14 is a view showing the designations of values of an EAS_content_IP_datagram_type element according to an embodiment of the present invention.

In a case in which the value of the EAS_content_IP_datagram_type element is '0x00,' this indicates that the structure of an IP datagram transferring EAS Rich Media Content is not defined.

In a case in which the value of the EAS_content_IP_datagram_type element is '0x01,' this indicates that the IP datagram transferring EAS Rich Media Content is transferred through File delivery over Unidirectional Transport (FLUTE).

In a case in which the value of the EAS_content_IP_datagram_type element is '0x02,' this indicates that the IP datagram transferring EAS Rich Media Content is transferred through the IP datagram previously described in the present invention.

Figure 15:
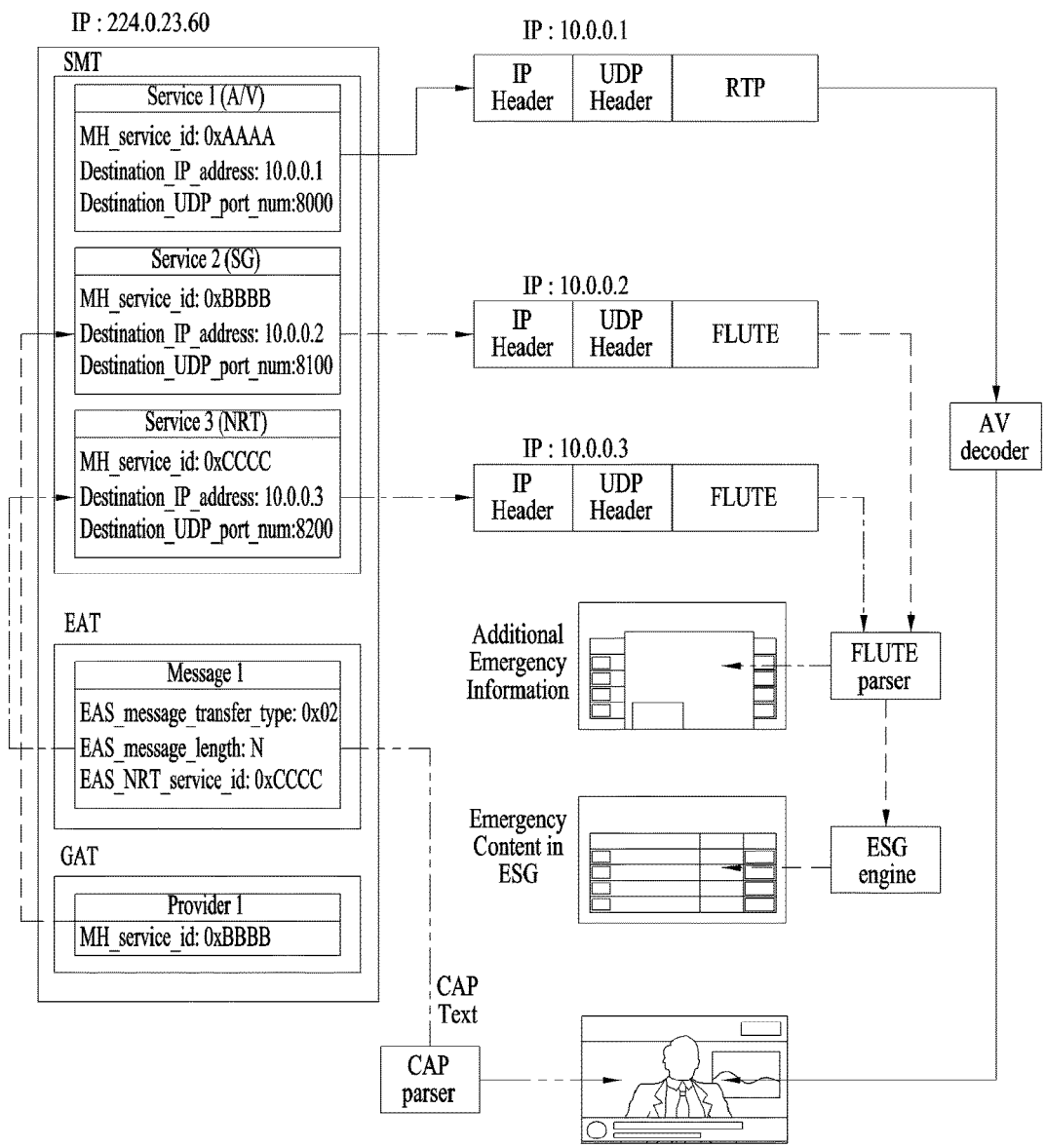
FIG. 15 is a view showing the processing of emergency alert data using an emergency alert table according to an embodiment of the present invention.

FIG. 15 is a view showing the processing of emergency alert data using an emergency alert table according to an embodiment of the present invention.

According to an embodiment of the present invention, a Common Alerting Protocol (CAP) alert message may be compressed so as to reduce the size of a mobile emergency alert table. A mobile receiver (M/H receiver) that is capable of identifying a mobile emergency alert table may extract the compressed CAP alert message. In this case, the mobile receiver may decompress the CAP alert message, and may rapidly display an emergency alert message in a state of not referring to an SMT.

The mobile emergency alert table may transmit NRT_service_id for the entry of the emergency alert message, and NRT_service_id indicates that additional content related to the emergency alert message is transferred through a Non-Real-Time (NRT) broadcast service. A broadcast receiver that is capable of receiving the NRT broadcast service may display the additional emergency alert message with reference to a Service Guide (SG) and/or a File Delivery over Unidirectional Transport (FLUTE) session signaled for an NRT service.

The number of repetitive receptions of the mobile emergency alert table may vary depending upon the importance of an emergency alert message. An emergency alert message having the highest importance may be repeated every MH frame.

Referring to FIG. 15, the broadcast receiver may identify an IP address and UDP port number of a corresponding service in an SMT with reference to MH_service_id of a GAT, may parse FLUTE data transmitted therethrough, and may show that emergency alert content is included through an Electronic Service Guide (ESG). The broadcast receiver may identify an IP address and UDP port number transmitting a service including an emergency alert message transferred in NRT with reference to EAS_NRT_service_id of the mobile emergency alert table, may parse FLUTE data transmitted therethrough, and may display the emergency alert message. Alternatively, the mobile emergency alert table may include an emergency alert message. In this case, the emergency alert message may be directly parsed through a CAP parser, and may then be displayed.

In this embodiment, the ESG/NRT is used to provide EAS Rich media content. That is, the EAT-MH includes an EAS NRT service ID that is capable of receiving rich media content together with EAS message bytes. The receiver may find an NRT service ID from the SMT, may identify an IP address and UDP port number of a corresponding flute component, and may receive EAS rich media content. In addition, information related to each file is transmitted in a state of being included in the ESG. In order to find the related information, therefore, it is possible to find a Provider Service ID of the GAT, to identify an IP and Port number transmitting ESG data in the SMT, and to receive the ESG data. In order to provide the EAS message and the rich media content, it is necessary for the receiver to support ESG and NRT services.

Figure 16:
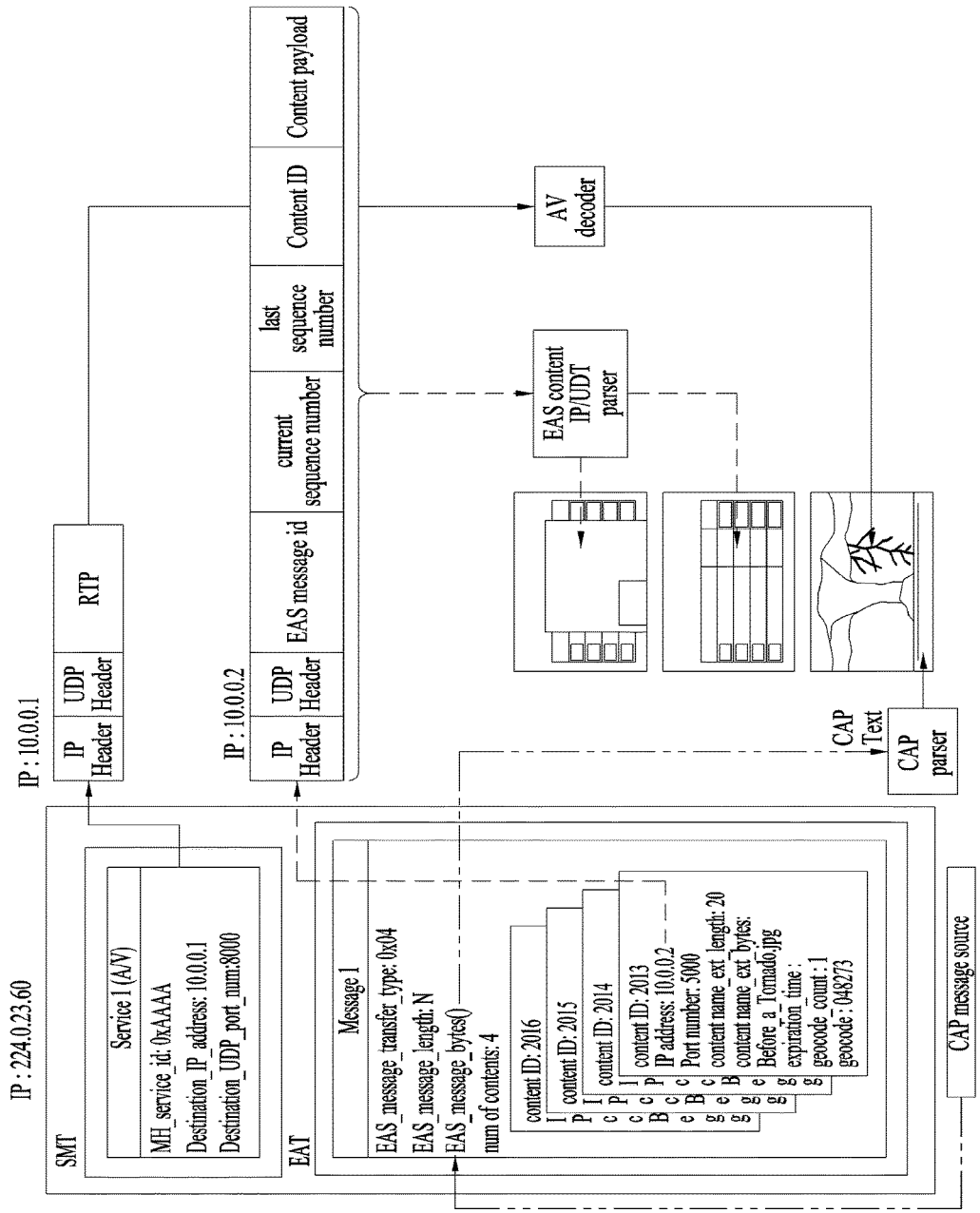
FIG. 16 is a view showing the processing of emergency alert data using an emergency alert table according to another embodiment of the present invention.

FIG. 16 is a view showing the processing of emergency alert data using an emergency alert table according to another embodiment of the present invention.

Another embodiment of the present invention proposes a method of transferring and signaling emergency alert messages and EAS Rich Media Content without using an ESG/NRT. In another embodiment of the present invention, any receiver which does not support an ESG/NRT service may receive and process EAS Rich Media Content.

In another embodiment of the present invention, a case in which the value of an EAS_message_transfer_type field of an emergency alert table is 0x04 will be described by way of example.

In a case in which the value of the EAS_message_transfer_type field included in the emergency alert table is 0x04, this indicates that transmission information regarding emergency alert messages and EAS rich media content is transferred in a state of being embedded in the emergency alert table. For example, in a case in which there are four emergency alert messages and four pieces of EAS rich media content, ID information capable of identifying each piece of EAS rich media content, expiration and geocode information indicating information regarding whether the transmitted information is to be shown to a user after being received, and/or the name and extension of the EAS rich media content may be signaled through the emergency alert table together with IP/Port information, through which each piece of EAS rich media content is transferred.

The EAS rich media content is transferred through an IP datagram described in the emergency alert table. The emergency alert table includes information that is capable of acquiring an IP datagram for transferring the EAS rich media content.

Referring to FIG. 16, the receiver parses an emergency alert message in the emergency alert table, and displays the parsed emergency alert message on a screen. Meanwhile, the receiver acquires the number of pieces of emergency alert content related to the corresponding emergency alert table and an address (IP_address, Port_number) of an IP datagram for transmitting the corresponding content, and accesses the acquired address. The receiver receives an IP datagram including emergency alert content from the corresponding address, parses the received IP datagram, and displays the emergency alert content.

Figure 17:
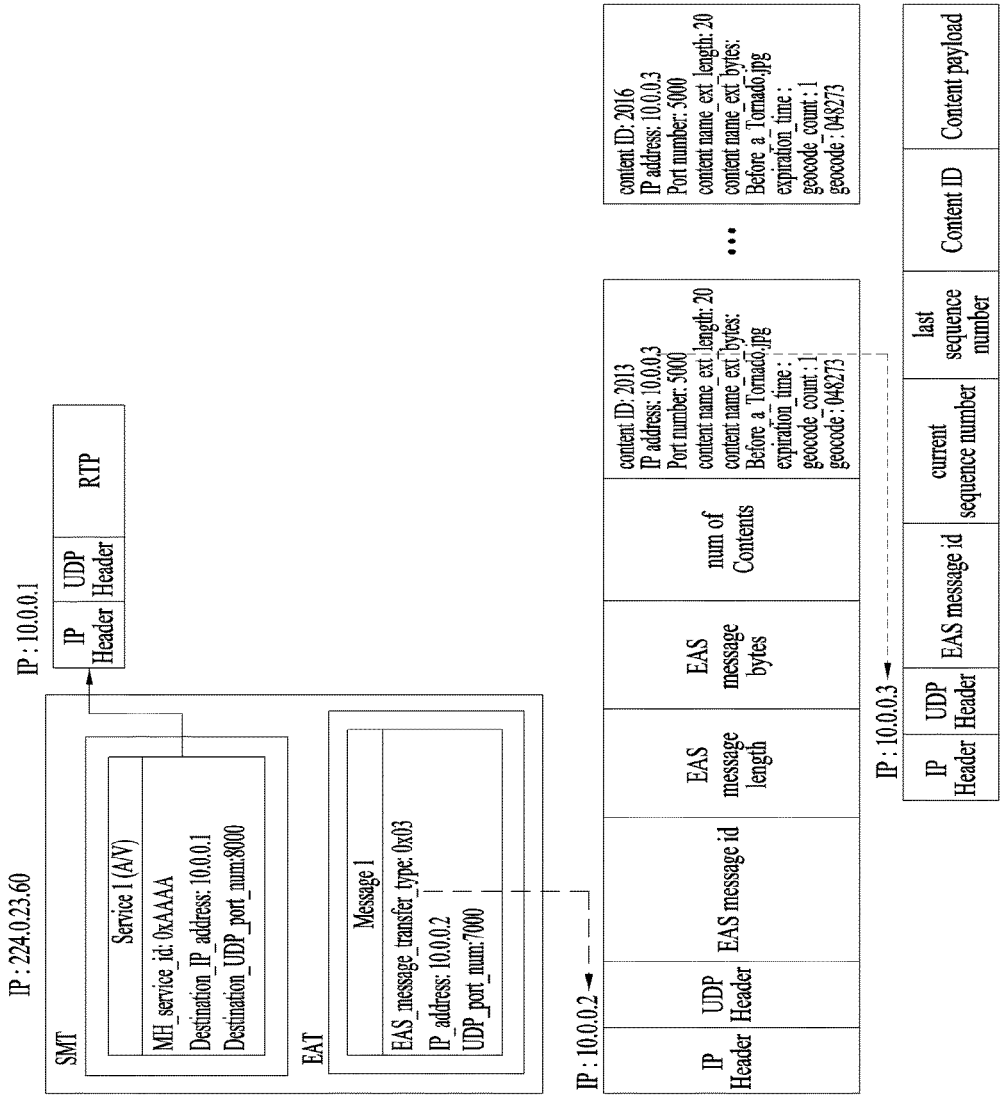
FIG. 17 is a view showing the processing of emergency alert data using an emergency alert table according to a further embodiment of the present invention.

FIG. 17 is a view showing the processing of emergency alert data using an emergency alert table according to a further embodiment of the present invention.

A further embodiment of the present invention proposes a method of transferring and signaling emergency alert messages and EAS Rich Media Content without using an ESG/NRT. In a further embodiment of the present invention, any receiver which does not support an ESG/NRT service may receive and process EAS Rich Media Content.

In a further embodiment of the present invention, a case in which the value of an EAS_message_transfer_type field of an emergency alert table is 0x03 will be described by way of example.

In a case in which the value of the EAS_message transfer type field included in the emergency alert table is 0x03, emergency alert messages are not included in the emergency alert table, and IP/Port information of an IP datagram for transmitting emergency alert messages is described in the emergency alert table.

In this case, the emergency alert table may include IP/Port information for transmitting emergency alert messages and EAS Rich media content, the structure of an IP datagram identified by the IP/Port information may include EAS_message_ID, the length of EAS_message, and the actual data of EAS_message, and the number of pieces of EAS rich media content and transfer information/description information regarding each piece of the EAS rich media content may be further included. The structure of the IP datagram for transferring the EAS rich media content was previously described.

Figure 18:
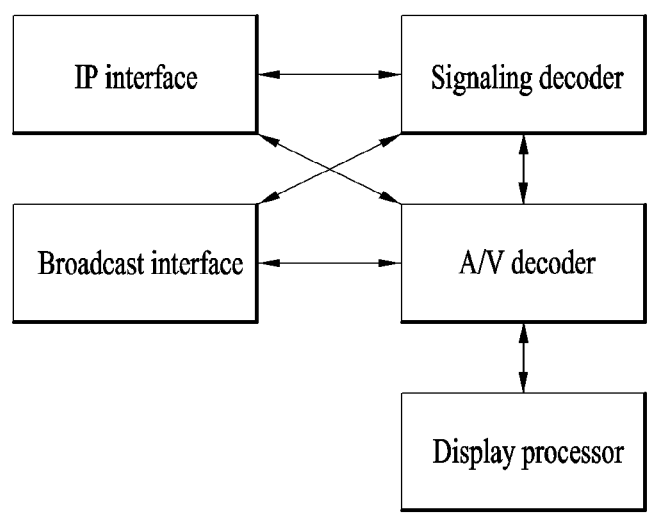
FIG. 18 is a view showing a broadcast receiver according to an embodiment of the present invention.

FIG. 18 is a view showing a broadcast receiver according to an embodiment of the present invention.

A broadcast receiver according to an embodiment of the present invention may include an IP interface, a broadcast interface, a signaling decoder, an A/V decoder, and/or a display processor.

The IP interface receives and processes IP-based data. For example, the IP interface functions to receive the above-described IP datagram. The IP interface may function to receive an IP datagram identified by the signaling decoder.

The broadcast interface receives and processes a broadcast signal. The broadcast interface may receive and process a terrestrial broadcast signal, a satellite broadcast signal, and/or a cable broadcast signal. The broadcast interface performs VSB and/or OFDM type demodulation based on a broadcast signal modulation mode.

The signaling decoder parses data/information related to the above-described signaling. In a case in which signaling information is transmitted through an IP datagram, the signaling decoder may parse the IP datagram. The signaling decoder may parse signaling information, such as Program Specific information (PSI), Program and System Information Protocol (PSIP), and/or Service Signaling Channel (SSC), included in the broadcast signal. The signaling decoder may transmit the signaling information to the respective units such that the receiver parses/decodes appropriate data.

The A/V decoder decodes audio/video data.

The display processor display-processes broadcast content, emergency alert messages, and/or emergency alert content.

While the present invention has been described with reference to separate drawings for the convenience of description, a new embodiment may be implemented by combining embodiments illustrated in the respective drawings. As needed by those skilled in the art, designing a computer-readable recording medium, in which a program for implementing the above-described embodiments is recorded, is within the scope of the present invention.

The apparatus and method according to the present invention may not be limitedly applied to the constructions and methods of the embodiments as previously described; however, all or some of the embodiments may be selectively combined to achieve various modifications.

Meanwhile, the method according to the present invention may be implemented as code that can be written on a processor-readable recording medium and thus read by a processor provided in a network device. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, the present specification describes both a product invention and a method invention, and descriptions of both the inventions may be complementarily applied as needed.

MODE FOR INVENTION

Various embodiments for carrying out the invention have been described in the best mode for carrying out the invention.

INDUSTRIAL APPLICABILITY

The present invention may be used in the broadcasting industry.

The invention claimed is:

1. A method of processing data in a receiver, the method comprising:
   receiving a broadcast signal including signaling data that include an emergency alert table, wherein the emergency alert table comprises message identification information for identifying an emergency alert message and information for access of a rich media content that is referenced in the emergency alert message and wherein the rich media content includes additional information related to the emergency alert message;
   parsing the signaling data contained in the broadcast signal, wherein the signaling data are carried in Internet Protocol (IP) packets with a well-known IP address;
   acquiring the emergency alert table from the parsed signaling data; and
   acquiring the rich media content from the broadcast signal based on the information in the acquired emergency alert table.

2. The method of claim 1, wherein the information for access of the rich media content includes access information of the rich media content and size information of the rich media content.

3. The method of claim 2, wherein the information for access of the rich media content further includes content type information of the rich media content.

4. The method of claim 1, wherein the additional information corresponds to at least one of an image, an audio, and a video related to the emergency alert message.

5. A receiver for processing data, the receiver comprising:
   a receiving unit to receive a broadcast signal including signaling data that include an emergency alert table, wherein the emergency alert table comprises message identification information for identifying an emergency alert message and information for access of a rich media content that is referenced in the emergency alert message and wherein the rich media content includes additional information related to the emergency alert message; and
   a processor to:
      parse the signaling data contained in the broadcast signal, wherein the signaling data are carried in Internet Protocol (IP) packets with a well-known IP address,
      acquire the emergency alert table from the parsed signaling data, and
      acquire the rich media content from the broadcast signal based on the information in the acquired emergency alert table.

6. The receiver of claim 5, wherein the information for access of the rich media content includes access information of the rich media content and size information of the rich media content.

7. The receiver of claim 6, wherein the information for access of the rich media content further includes content type information of the rich media content.

8. The receiver of claim 5, wherein the additional information corresponds to at least one of an image, an audio, and a video related to the emergency alert message.

* * * * *